US011750475B1

(12) United States Patent
Gonzalez et al.

(10) Patent No.: US 11,750,475 B1
(45) Date of Patent: Sep. 5, 2023

(54) MONITORING CUSTOMER APPLICATION STATUS IN A PROVIDER NETWORK

(71) Applicant: Amazon Technologies, Inc., Seattle, WA (US)

(72) Inventors: Aaron Villalpando Gonzalez, Seattle, WA (US); Benjamin Van Der Merwe, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 698 days.

(21) Appl. No.: 16/248,450

(22) Filed: Jan. 15, 2019

(51) Int. Cl.
*H04L 12/24* (2006.01)
*G06F 9/54* (2006.01)
*G06F 9/455* (2018.01)
*H04L 41/50* (2022.01)

(52) U.S. Cl.
CPC ...... *H04L 41/5032* (2013.01); *G06F 9/45558* (2013.01); *G06F 9/547* (2013.01); *H04L 41/5096* (2013.01); *G06F 2009/4557* (2013.01); *G06F 2009/45595* (2013.01)

(58) Field of Classification Search
CPC ............... G06F 9/547; G06F 9/45558; G06F 2009/4557; G06F 2009/45595; H04L 41/5032; H04L 41/5096
See application file for complete search history.

(56) References Cited

U.S. PATENT DOCUMENTS 10,623,285 B1 * 4/2020 Shevade ............. H04L 43/0817
10,705,880 B2 * 7/2020 Curtis .................... H04L 43/04
2006/0029016 A1 * 2/2006 Peles ....................... H04L 69/16
370/328
2013/0297672 A1 * 11/2013 McGrath ............. G06F 11/3003
709/202
2013/0332927 A1 * 12/2013 Tang ................... G06F 9/45558
718/1
2020/0112497 A1 * 4/2020 Yenumulapalli .... H04L 41/5009

OTHER PUBLICATIONS

Hinden, et al., "Unique Local IPv6 Unicast Addresses", Network Working Group, Request for Comments: 4193, Oct. 2005, 16 pages.
Rekhter, et al., "Address Allocation for Private Internets", Network Working Group, Request for Comments: 1918, Feb. 1996, 9 pages.
Amazon Web Services, Inc., "Monitoring the Status of Your Instances", Amazon Elastic Compute Cloud, available online at <https://docs.aws.amazon.com/AWSEC2/latest/UserGuide/monitoring-instances-status-check.html>, Dec. 19, 2019, 1 page.
Amazon Web Services, Inc., "Status Checks for Your Instances", Amazon Elastic Compute Cloud, available online at <https://docs.aws.amazon.com/AWSEC2/latest/UserGuide/monitoring-system-instance-status-check.html>, Jul. 11, 2019, 7 pages.

* cited by examiner

*Primary Examiner* — Kostas J Katsikis
(74) *Attorney, Agent, or Firm* — NICHOLSON DE VOS WEBSTER & ELLIOTT LLP

(57) ABSTRACT

Techniques for monitoring the status of an application executing within an instance hosted by a provider network are described. A request to monitor an application is received, the request associated with an account of the provider network and including an identification of the application and an identification of a status model. A status indicator of the application is obtained. A state of the application is determined based on the status indicator and a status model that relates the status indicator to one of a plurality of application states. An action is performed based on the state of the application.

20 Claims, 8 Drawing Sheets

MONITORING CUSTOMER APPLICATION STATUS IN A PROVIDER NETWORK

BACKGROUND

The advent of virtualization and other technologies has provided benefits with respect to managing large-scale computing resources for many data center customers with diverse needs, allowing various computing resources to be efficiently and securely shared by multiple customers. For example, virtualization technologies can allow a single physical computing machine to be shared among multiple users by providing each user with one or more virtual machines hosted by the single physical computing machine. Each such virtual machine is a software simulation acting as a distinct logical computing system that provides users with the illusion that they are the sole operators and administrators of a given hardware computing resource for executing user applications, while also providing application isolation and security among the various virtual machines. As another example, containers allow a single operating system to be shared among multiple users by isolating user applications within containers, where the operating system is hosted by the single physical computing machine (or virtual machine). As the scale and scope of typical data centers has increased, the tasks of provisioning, administering, and managing the physical computing resources have become increasingly complicated.

BRIEF DESCRIPTION OF DRAWINGS

Various embodiments in accordance with the present disclosure will be described with reference to the following drawings.

DETAILED DESCRIPTION

Figure 1:
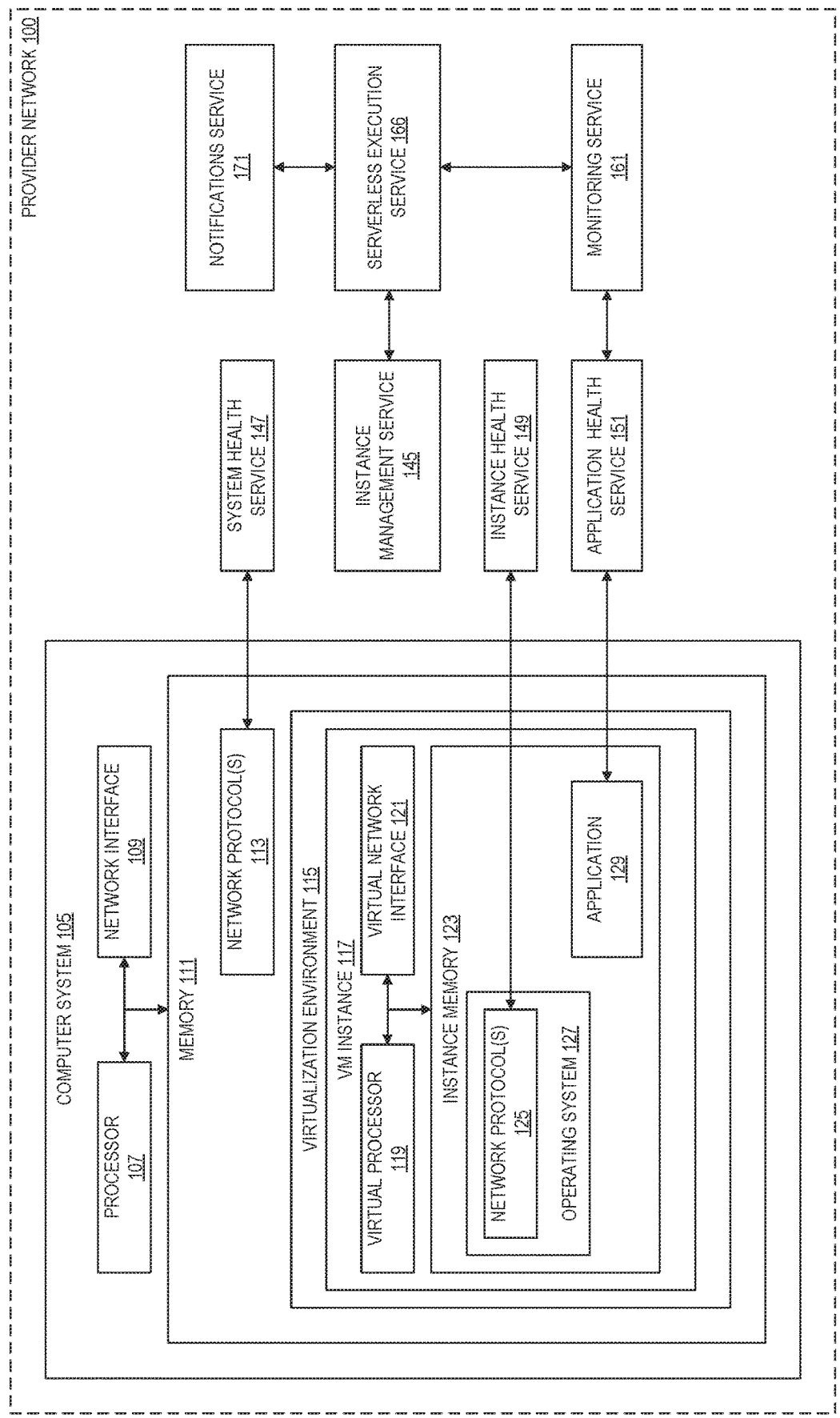
FIG. 1 is a diagram illustrating an environment for monitoring customer applications hosted within a provider network according to some embodiments.

Various embodiments of methods, apparatus, systems, and non-transitory computer-readable storage media for monitoring customer applications hosted within a provider network are described. According to some embodiments, customers can execute customer applications (e.g., programs, executable instructions, etc.) with computing resources of the provider network. Customers can enable application status monitoring of their applications hosted within the provider network by identifying the application to be monitored, providing a model that describes expected application behavior in monitoring, and configuring one or more actions to be taken in response to a detection of anomalous or unexpected application status. As used herein, the provider network hosts customer applications within a customer application environment, which may include virtual machines, containers, or other technologies that provide application isolation and permit sharing of physical computing resources. These customer application environments may generally be referred to as "instances."

Customer applications may exhibit anomalous behavior for a variety of reasons, such as a bug in the application, or the provider pushing software updates to the underlying physical computer systems executing customer applications that inadvertently affect the health or status of one or more of the customer applications. Lacking insight into customer application status, the provider network may continue to host customer applications that are exhibiting anomalous behavior for an indefinite period of time or until the application indirectly impacts the status of other provider-controlled resources that are being monitoring, such as the status of physical computing machines or systems that run customer applications or the status of the particular technology through which the physical computer system is being shared (e.g., a virtualization environment that hosts virtual machines or a container engine that hosts containers). To avoid scenarios where a customer application is operating in an error state, and to avoid a delay in indirect detection by other provider network monitoring techniques, customers may provision additional computing resources within the provider network to monitor the customer applications. Such solutions increase the complexity of the customer application ecosystem and may require the customer to lease or rent additional provider network resources to implement the customer application monitoring software.

To address these and other challenges, the present disclosure presents various techniques for customer application monitoring by the provider network. Customers can launch and/or manage customer applications that execute within an instance hosted by computing resources of the provider network. In some embodiments, a provider network includes an application health service to monitor the status of customer applications hosted within the provider network. The application health service may query customer applications for status information, or the customer applications may send status information to the application health service. In some embodiments, an agent associated with the customer application sends or provides the application status information to the application health service. The application health service compares the obtained status information against a customer-specified model that relates status information to application state. As one example, the application health service can monitor responses returned from HTTP calls to a specified port, for instance by checking the responses against a set of HTTP response codes that have been specified by the system and/or customer as representing an unhealthy state of the application. If the application health service determines that the customer application is not operating normally, the application health service can cause a customer-specified or system-specified remediation, such as restarting the application, restarting the instance hosting the application, re-launching the application within an instance hosted on another physical computer system, migrating the application to an instance hosted on another computer system, notifying the customer of the error, etc.

Beneficially, by introducing one or more of the techniques described herein, the provider network can gain insight into customer application status. In doing so, the burden on the customer to develop its own monitoring software is reduced, and the provider network may use the application-level status as an early indicator that there might be something wrong with the physical computer system or sharing software used to host the customer application (e.g., based on a recent update pushed by a provider). Further, the disclosed techniques can enable to provider network to provide for application recovery. For example, customers may opt-in to automatic actions to reboot, stop, terminate, or auto-recover instances when they fail an application status check. As another example, the provider system may automatically replace instances that fail an application status check.

FIG. 1 is a schematic block diagram illustrating an environment for monitoring customer applications hosted within a provider network, according to some embodiments. A provider network 100 provides users with the ability to utilize one or more of a variety of types of computing-related resources such as compute resources (e.g., executing virtual machine (VM) instances, executing lightweight or micro VMs, executing container instances, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. The users or customers of provider networks 100 may utilize the computing-related resources of the provider network 100 with one or more user accounts that are associated with a customer account. The terms user and customer may be used somewhat interchangeably depending upon the context of use.

To provide these and other computing-related resource, provider networks 100 often rely upon techniques to allow sharing of computer systems amongst customers, such as virtual machines and containers. For example, virtualization technologies may be used to provide users the ability to control or utilize compute instances (e.g., a virtual machine (VM) using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple instances can be implemented using a single computer system. Thus, a user may directly utilize an instance hosted by the provider network to perform a variety of computing tasks or may indirectly utilize a compute instance by submitting code to be executed by the provider network, which in turn utilizes a compute instance to execute the code (typically without the user having any control of or knowledge of the underlying compute instance(s) involved).

A computer system 105 is one such shared computing resource. The computer system 105 includes a processor 107, a network interface 109, and memory 111. In one embodiment, the processor 107 is a general-purpose processor, the network interface 109 is an Ethernet-based network interface card, and the memory 111 can include a combination of one or more memory technologies, such as volatile and non-volatile memories (e.g., random-access memory (RAM) and magnetic or solid-state disk drives). In this example, the computer system 105 is executing a number of software applications that are illustrated as resident in the memory 111. The software applications include network protocol(s) 113, which may be an IP-based networking stack to facilitate communications to and from the computer system 105 and the provider network 100 via the network interface 109. The software applications also include a virtualization environment 115, such as Xen, KVM, or VMWare. The virtualization environment 115 provides for the launch and termination of VMs or other facility for applications to share the processor 107, the network interface 109, and the memory 111. As shown, the virtualization environment 115 has launched a VM instance 117 that is allocated a virtual processor 119, a virtual network interface 121, and instance memory 123, each of which may use some portion of the capacity of the processor 107, the network interface 109, and the memory 111, respectively. The VM instance 117 is executing a number of software applications that are illustrated as resident in the instance memory 123, including an operating system 127 that includes network protocol(s) 125 and an application 129 that is owned, launched, and/or managed by a customer of the provider network.

The provider network 100 includes a number of services, each of which may be implemented by one or more computer systems of the provider network 100. By dividing the services amongst multiple computer systems, the provider network 100 is able to provision, administer, and manage large amounts of computing-related resources to many customers. One such service is an instance management service 145. The instance management service 145 can be made of various sub-services that provide customers with the ability to launch instances, including virtual machines and containers, within the provider network 100. Customers can issue a request to launch an instance to the instance management service 145, and the instance management service 145 identifies a computer system to host the instance and causes the computer system to launch the instance. For example, a customer may have requested the launch of a VM instance, and the instance management service 145 identified computer system 105 to host a VM instance and causes the computer system 105 to launch the VM instance 117. The customer could then execute customer applications within the VM instance 117, such as application 129.

The exemplary provider network 100 includes a number of monitoring services that monitor different aspects of the computer systems that host instances. These monitoring services may be part of the instance management service 145, in some embodiments. In this example, the provider network 100 includes three levels of monitoring: a system health service (SHS) 147 to monitor the status of the physical instance-hosting computer systems, including computer system 105; an instance health service (IHS) 149 to monitor the status of the instances hosted by a computer system, such as VM instance 117; and an application health service (AHS) 151 to monitor the status of customer applications, such as customer application 129. Various monitoring techniques may be used, such as checking whether the system and/or instance is responsive. For example, the SHS 147 can issue an Internet Control Message Protocol (ICMP) ping to the computer system 105 to check whether the computer system 105 is responsive based on a reply from the network protocol(s) 113. As another example, the SHS 147 can query an agent (not shown) resident within the memory 111 and executed by the processor 107 that provides system status information to the SHS 147. Likewise, the IHS 149 can ping the VM instance 117 to check whether the VM instance 117 is responsive based on a reply from the network protocol(s) 125, or the IHS 149 can query an agent (not shown) resident within the instance memory 123 and executed by the virtual processor 119 that provides instance status information to the IHS 149. As another example, the SHS 147 or IHS 149 can respectively issue Address Resolution Protocol (ARP) requests to check whether the system or instance is responsive.

Customers can launch and/or manage customer applications executing within an instance hosted by the provider network. For example, a customer may launch a web server within an instance hosted by a computer system of the provider network. The customer can program the web server to listen to requests directed to a bound Internet Protocol (IP) address and port number. In addition to responding to requests from the AHS 151, the web server may respond to other applications executed by other computer systems of the provider network or by computer systems or devices hosted outside of the provider network. For example, the customer's web server may respond to requests from other customer applications hosted within the provider network. As another example, the customer's own customers (e.g., third-parties) may issue requests for web pages to the web server via a web browser executed on a device or system outside of the provider network. In one embodiment, the AHS 151 monitors the customer application via the same IP address and port number that the customer application listens to for requests from other applications (e.g., from third-party browsers).

In some embodiments, the customer provides configuration data to the AHS 151 so the AHS 151 can query the application for a response that includes application status information. Such configuration data can include, but is not limited to, identification information of the application (e.g., an IP address and port number, an identifier that identifies the application within the provider network, etc.) and an identification of a status model. The AHS 151 can use the identified status model to evaluate the application's status information to determine the application's state (e.g., whether the application is in error). In some embodiments, the AHS 151 may offer an application programming interface (API) through which customer applications can submit status information. The customer provides an identification of a status model to the AHS 151 and configures the application 129 to issue a call to an API of the AHS 151 to submit application status information. Upon receiving application status information (either in response to a query or to an API call), the AHS 151 compares the application status information against the status model to determine application state. The state of an application can be represented by two or more states (e.g., "healthy"/"unhealthy" or "normal"/"fault"/"nonresponsive") and, optionally, tailored by the customer to the application. For example, if the application 129 is a web server, the customer can configure the AHS 151 to send a Hypertext Transfer Protocol (HTTP) request to the application 129 and evaluate the HTTP status code received in response to the request. For example, a status code of 200 could indicate that the web server is OK, and the status model indicates that a status code of 200 corresponds to a healthy state. Similarly, a status code of 500 could indicate that the web server has experienced an internal server error, and the status model indicates that a state code of 500 corresponds to an unhealthy state. In some embodiments, the absence of a response from the application or the absence of an API call by the application may indicate that the application is in error, which can be reflected in the status model.

The application status information can include one or more status indicators of the application. Additionally or alternatively to using error codes or application responsiveness as indicators of application state, the application status information can include other indicators such as an amount of processor, memory, or other computing resource usage by the application, a number of applications exceptions or errors over since the last reporting of application status information, etc.

The status model defines the state of an application based on the application status information. In some embodiments, the provider network can offer one or more predefined status models for frequently deployed applications. For example, a predefined status model for web servers may define application states based on HTTP status codes. The customer can also define a custom status model that correlates status indicators within the application status information to application states. The status model can be sensitive to indicators in the application status information, such as treating a high processor utilization indicator as a high processor utilization state, a high-exception state, etc. In some embodiments, the status model includes a default, nominal state or one or more custom states that are associated with normal application operation. The AHS 151 detects an application exhibiting anomalous behavior by applying the status model to the obtained application status information. When the resultant application state is not associated with normal application operation, the AHS 151 can cause a number of actions depending on the implementation.

For example, the AHS 151 can cause other services of the provider network 100 to take one or more actions to attempt to fix the application and/or to notify the customer of the application state. Exemplary actions include restarting the application (e.g., by running a script on the instance hosting the application), restarting the instance hosting the application (e.g., via a command to the instance management service 145), re-launching the application within an instance hosted on another physical computer system (e.g., via a command to the instance management service 145), migrating the application to an instance hosted on another computer system (e.g., via a command to the instance management service 145), notifying the customer of the error (e.g., via a command to the notifications service 171), etc.

In some embodiments, the customer can configure the AHS 151 to message to the instance management service 145 to cause the instance management service 145 to restart the instance hosting the application (e.g., VM instance 117) or to move the instance hosting the application to another physical computer system. The AHS 151 can send the message anytime the AHS 151 determines the application is in a non-default state. In some embodiments, the AHS 151 can send a message to a monitoring service 161 that includes the state of the application and/or application status information. Such a message may be sent periodically or in response to a change in state. The message includes the state of the application and, optionally, additional details from the application status information that resulted in the application state (e.g., an error code). As one example, the AHS 151 can treat changes in application state as events that are reported to the monitoring service.

In some embodiments, the AHS 151 can accumulate application status information for a given application as part of a history or log of the application's status. The AHS 151 can use the historical data to generate application status metrics such as the frequency of remediation actions, error states, etc. In some embodiments, the AHS 151 vends an API that allows the customer to query the AHS for the historical information or metrics associated with the customer application.

The monitoring service 161 is another service of the provider network 100. The customer can configure the monitoring service with one or more rules or trigger conditions that govern when and what actions to take in response to a message from the AHS 151 (e.g., as events associated with state changes). When the application state or event satisfies the one or more rules or conditions, the monitoring service 161 can cause one or more actions to be taken. For example, the monitoring service 161 can send a message to the instance management service 145 to cause the instance management service 145 to restart the instance hosting the application (e.g., VM instance 117) or to move the instance hosting the application to another physical computer system. As another example, the monitoring service 161 can be configured to trigger a program executed by a serverless execution service 166.

The serverless execution service 166 is another service of the provider network 100. Customers can author programs that are executed without provisioning a dedicated instance and only upon meeting one or more triggering conditions. A customer can configure one or more programs with the serverless execution service 166 and configure the monitoring service 161 to trigger the one or more programs depending on the application status. The customer program(s) can perform various actions including causing the instance management service 145 to restart the instance hosting the application (e.g., VM instance 117) or move the instance hosting the application to another physical computer system, alert the customer via a notifications service 171, etc. The notifications service 171 is another service of the provider network 100 that can alert users of changes in application status (e.g., from nominal to error) via e-mail, short message service (SMS), etc.

Figure 2:
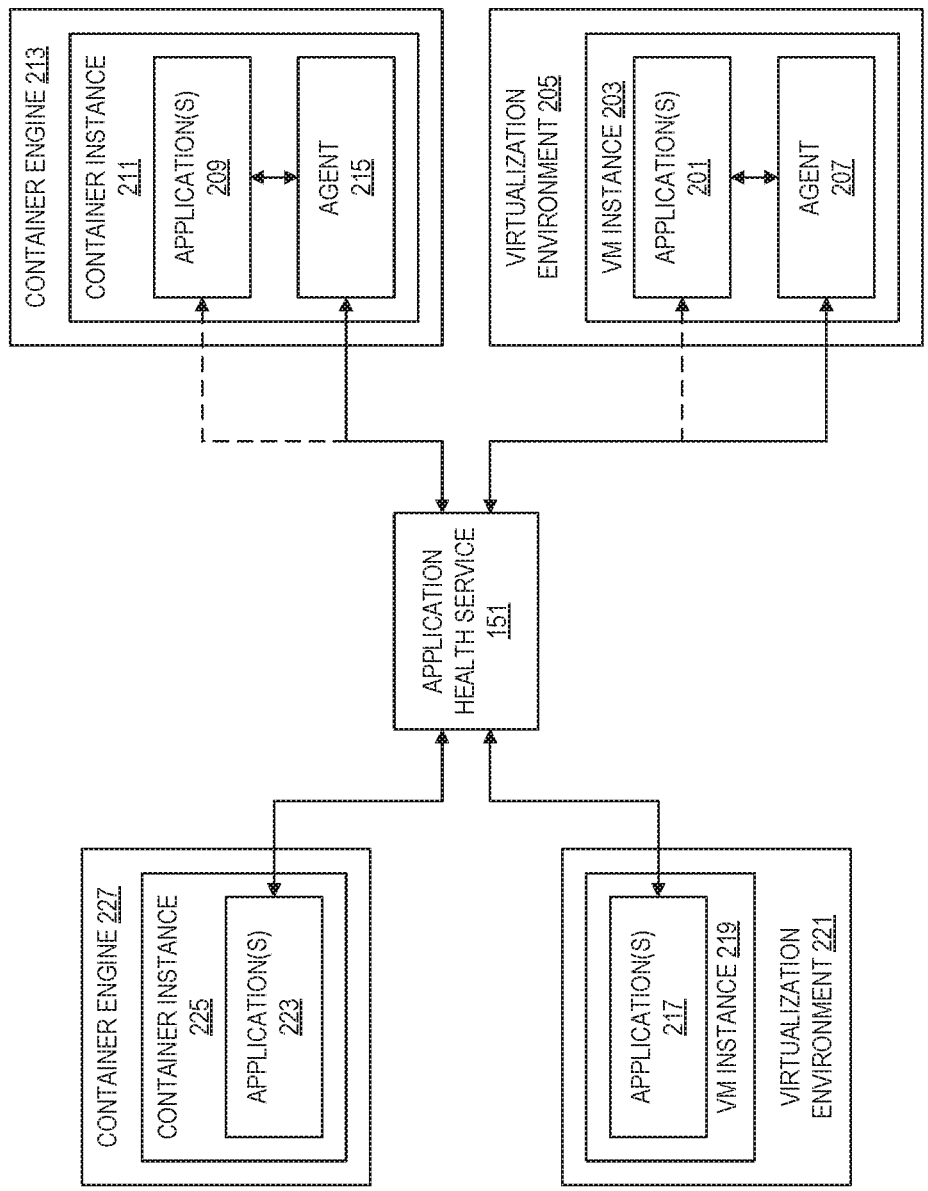
FIG. 2 is a diagram illustrating additional exemplary customer application monitoring configurations according to some embodiments.

FIG. 2 is a diagram illustrating additional exemplary customer application monitoring configurations according to some embodiments. As described above, the AHS 151 can be used to monitor applications executing within a variety of instances, such as virtual machines or containers. In some configurations, the AHS 151 directly monitors application status (whether by querying or receiving API calls from the application). As shown on the left side of FIG. 2, the AHS 151 is monitoring an application 217 and an application 223. The application 217 is executing within VM instance 219 hosted by a virtualization environment 221, and the application 223 is executing within a container instance 225 hosted by a container engine 227. As noted above, in some embodiments a container engine 227 may be executing within a VM instance (not shown).

In some configurations, the AHS 151 indirectly monitors application status via one or more agents executing within the same environment (e.g., operating system, memory space) as the application being monitored (whether by querying or receiving API calls from the agent). In this context, an agent is a software program that can provide application status information to the AHS 151. A customer can deploy an agent to provide additional status information that may not be visible to the application or to reduce changes to the application. For example, the agent can verify permissions of the requestor of application status information, can verify communications amongst multiple applications executing within the same instance or across multiple instances, etc. As shown on the right side of FIG. 2, the AHS 151 is indirectly monitoring an application 201 and an application 209 via an agent 207 and an agent 215, respectively. The application 201 and the agent 207 are executing within VM instance 203 hosted by a virtualization environment 205, and the application 209 and the agent 215 are executing within container 211 hosted by a container engine 213.

In some embodiments, the AHS 151 may obtain application status information from both an agent and associated application, as indicated by the dashed lines in FIG. 2. Such a scenario may be useful where application status information is obtained on different schedules (e.g., a more frequent polling of an application's responsiveness and a less frequent request of application status information from an associated agent).

Figure 3:
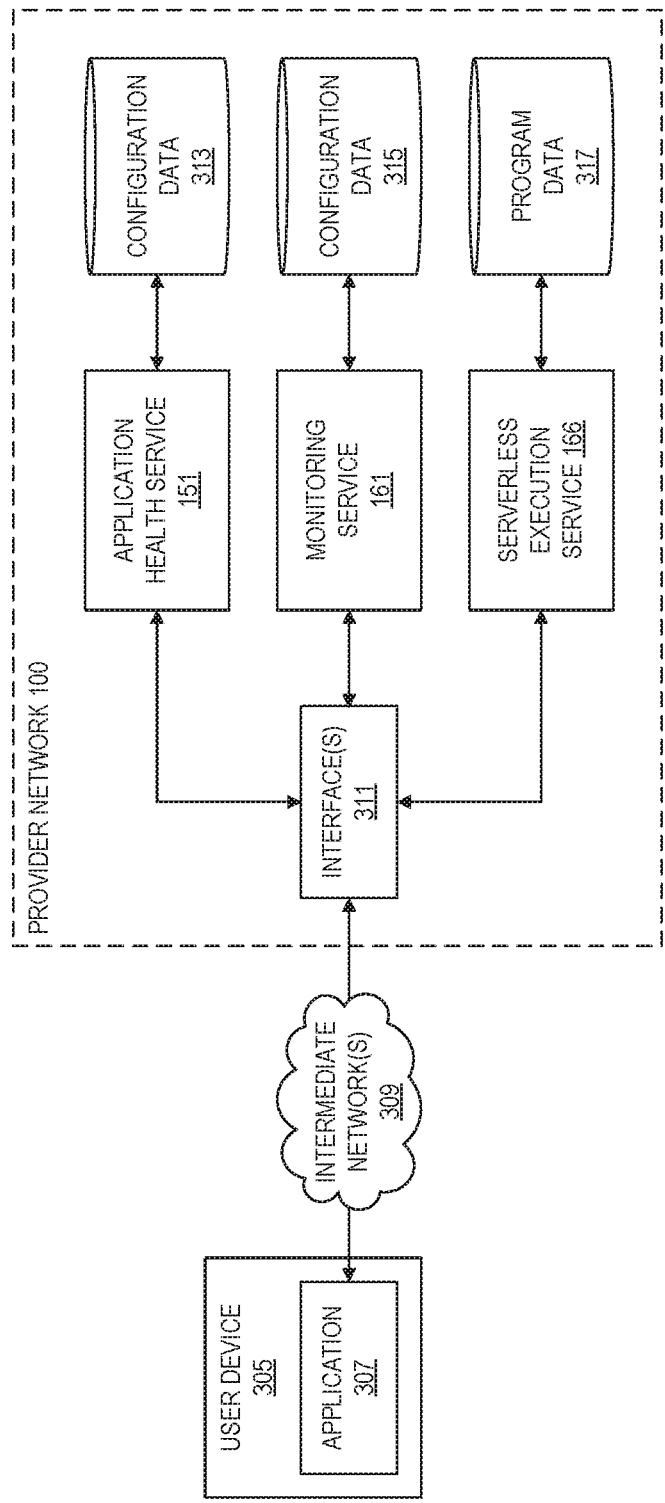
FIG. 3 is a diagram illustrating an environment for configuring customer application monitoring according to some embodiments.

FIG. 3 is a diagram illustrating an environment for configuring customer application monitoring according to some embodiments. As described above, in some embodiments, the AHS 151 sends application state information or state changes to the monitoring service 161. The monitoring service 161 evaluates the state of an application against one or more rules that determine actions to take based on the application state. For example, the monitoring service 161 may determine that another customer application is to be executed using the serverless execution service 166. To provide the customer with control over these and other aspects of monitoring of the customer's application within the provider network, the customer can provide configuration data or parameters to tailor the application monitoring and responsive actions to a given application. To do so, customers interact with the provider network 100 across one or more intermediate networks 309 (e.g., the internet) via one or more interface(s) 311, such as through use of API calls, via a console implemented as a website or application, etc. The interface(s) 311 may be part of, or serve as a front-end to, a control plane of the provider network 100 that includes "backend" services supporting and enabling the services, such as the AHS 151, the monitoring service 161, and/or the serverless execution service 166. For example, the customer may interact with a user device 305 executing an application 307 such as a web browser to access a web-based console to interact with various backend services. Such interactions can include configuring the AHS 151 to monitor an application, configuring the response of the monitoring service 161 to certain application states or events, and configuring a program to execute via the serverless execution service 166 as a response to an application state or event.

In configuring the AHS 151, the customer identifies a status model. For example, the customer can provide or identify a custom status model to the AHS 151 or select a predefined status model (e.g., a status model based on HTTP status codes). The AHS 151 uses the status model as described above to determine application state based on the obtained application status information.

In embodiments where the AHS 151 queries an application or agent, the customer identifies the application or agent being monitored and the associated interface. For example, the customer can provide identifying information such as an IP address of the instance hosting the application and a port number handling requests to the application or agent. The customer can identify the interface type of the application or agent. For example, if the application or agent vends an HTTP-based web service, the customer can indicate to the AHS 151 that queries should be formatted as HTTP requests.

In embodiments where the AHS 151 provides an API that applications or agents can call to provide application status information, the calls conform to the API. Exemplary parameters include information identifying the application and application status information.

The AHS 151 can store per-application configuration data in configuration data 313, which may be provided by a storage virtualization service of the provider network that provides services with local or network-attached non-volatile storage (e.g., disk drives, solid-state drives, etc.).

In configuring the monitoring service 161, the customer specifies both actions and triggers of the actions. The triggers may be based on application state and/or on application status information provided by the AHS 151 to the monitoring service 161. For example, the customer can specify that anytime an application enters an unresponsive state, the monitoring service 161 is to attempt to cause the restart of the instance hosting the application. As another example, the customer can specify that anytime an application transitions from a default or nominal state to a high processor usage state, the monitoring service 161 is to invoke execution of a target customer program using the serverless execution service 166. As yet another example, the customer can specify that anytime an application transitions from a default or nominal state to a high processor usage state where the processor usage indicator is above 90%, the monitoring service 161 is to invoke execution of one target customer program using the serverless execution service 166, while if the indicator is below 90%, the monitoring service 161 is to invoke execution of another target customer program using the serverless execution service 166. To identify a program to be executed by the serverless execution service 166, the customer can provide or identify a program identifier assigned to the program to the monitoring service 161. The monitoring service 161 can store per-application triggers and actions in configuration data 315, which may be provided by a storage virtualization service as described herein.

In configuring the serverless execution service 166, the customer can author custom programs to be carried out in response to an application entering an abnormal state. The serverless execution service 166 provisions resources for executing the custom program in response to requests, such as a request from the monitoring service 161 to execute a particular custom program. The customer tailors the custom program to attempt to remediate or recover the application based on the customer's knowledge of the application exhibiting anomalous behavior. Because resources to execute a custom program are not provisioned until runtime, the customer can avoid the overhead associated with an "over-the-top" monitoring and recovery solution implemented on other instances of the provider network. The serverless execution service 166 can store custom programs in program data 317, which may be provided by a storage virtualization service as described herein.

Figure 4:
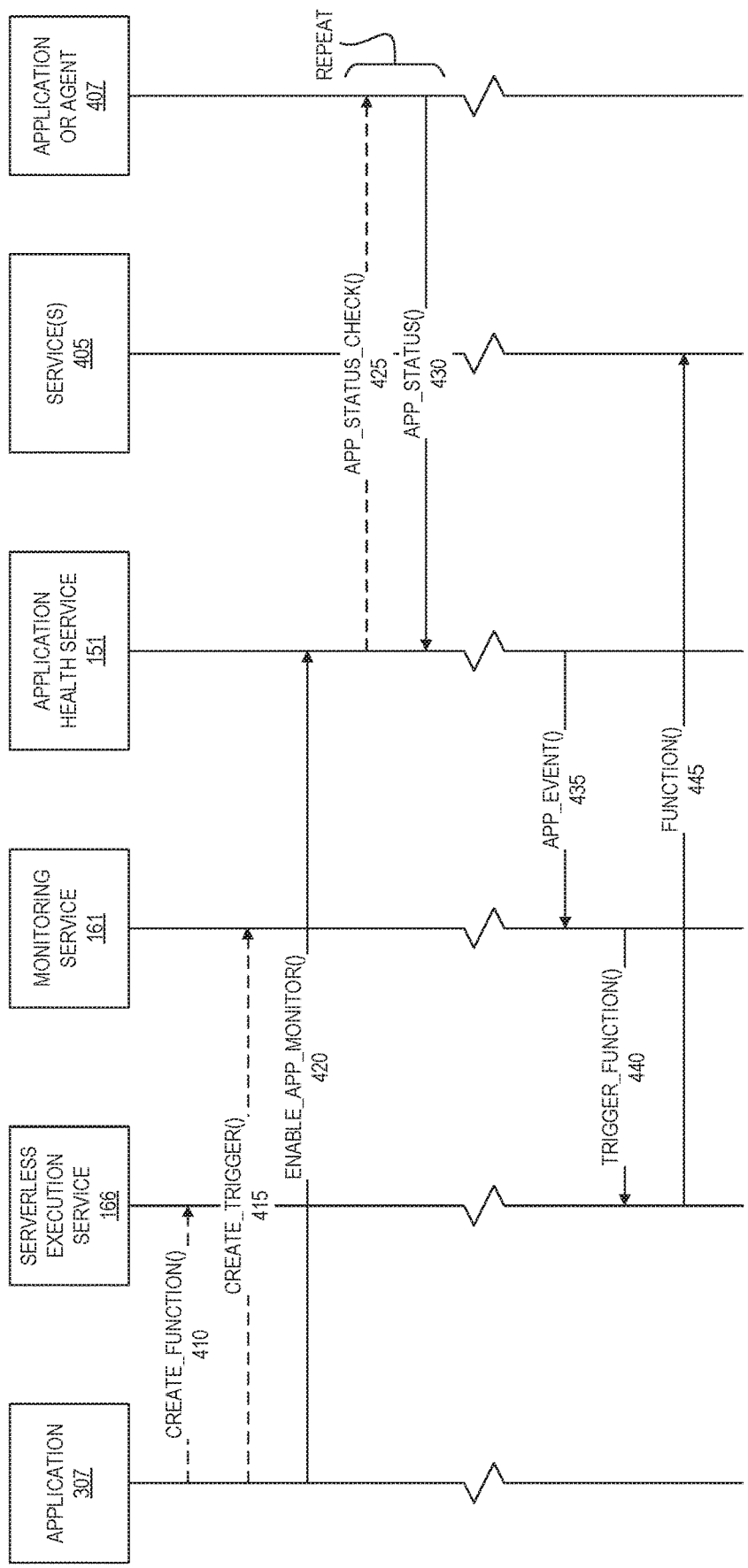
FIG. 4 is a diagram illustrating an exemplary call flow diagram according to some embodiments.

FIG. 4 is a diagram illustrating an exemplary call flow diagram according to some embodiments. The application 307 sends a message 410 to the serverless execution service 166 to create a function. The application can be a web browser executing on a customer's device such as user device 305. The message 410 can be an API call, and the function can be a custom program that executes in response to an application being monitored entering certain states. The serverless execution service 166 stores the function and can return an identifier to reference the function by, for example, the monitoring service.

The application sends a message 415 to the monitoring service 161 to create a trigger. The trigger can be based on one or more conditions related to an application state. The message 415 can be an API call and can include the trigger and an application identifier to associate application states or events received from the AHS 151 with the trigger.

The application sends a message 420 to the AHS 151 to enable application monitoring. As described herein, the message 420 can include or identify a status model to translate application status information into application state. The AHS 151 can actively query an application or agent 407 being monitored or can vend an API that the application or agent 407 can call to submit application state information. In the former case, the AHS 151 sends a message 425 to the application or agent 407 to obtain application status information, and the application or agent 407 responds with a message 430 that includes the application status information. In the latter scenario, the application or agent 407 sends application status information to the AHS 151 via message 430 issued to the API of the AHS 151. As indicated, the message 430 including the application status information is repeatedly reported to the AHS 151 on some repeated schedule during normal operation, such as in response to a polling schedule of messages 425 or some customer-specified schedule or frequency as part of configuring the AHS 151. In addition to application status information, the message 430 can include information identifying the instance hosting the application and the application.

As application status information is received, the AHS 151 applies the status model associated with the application to determine the application state. Having determined the application state, the AHS 151 sends a message 435 to the monitoring service 161 that includes an indication of the application state or event (e.g., state change). Depending on the implementation, the AHS 151 can send the message 435 any time there is an event, after each message 430, only when the status model indicates the application is in certain states, or some combination thereof. For example, if the status model classifies certain states as error states, the AHS 151 can send a message to the monitoring service 161 anytime the AHS 151 determines the application to be in an error state. If the AHS 151 sends a message 425 and fails to receive a response message 430 or fails to receive an expected message 430 (based on some schedule), the AHS can treat the absence of the message 430 as application status information as a state based on a model definition that includes a state associated with the absence of application status information. In some embodiments, the AHS 151 sends at least a portion of the application status information to the monitoring service 161.

The monitoring service 161 evaluates the message 435 to determine whether any of the rules or triggers associated with the application are satisfied. If so, the monitoring service 161 sends a message 440 to the serverless execution service 166 including an identifier of the program or function to be executed in response to the trigger that was satisfied. The message 440 can include application status information or status indicators received by the monitoring service 161 from the AHS 151. Upon receipt of message 440, the server serverless execution service 166 allocates resources on a computer system to execute the program or function created via message 410. For example, the serverless execution service 166 can launch an instance to execute the program. The program can be configured to perform a variety of operations, such as sending message(s) 445 to other services 405 of the provider network to restart the instance hosting the application, migrate the instance hosting the application to another computer system (e.g., by terminating the instance on the computer system hosting the application and launching the instance on another computer system), send a notification to the customer, etc. For example, the program can send a message to the instance management services 145 to launch the application on an instance hosted by a new computer system and terminate the instance hosting the application that reported status information that triggered the program. As another example, the program can send a message to the instance management services 145 to restart the instance hosting the application that reported status information that triggered the program. As yet another example, the program can send a message to the notifications service 171 to notify the customer of the application state that caused the notification.

Although FIG. 4 illustrates a provider network determines and responds to application states through coordination of the AHS 151, the monitoring service 161, and a program executed by the serverless execution service 166, other remediation or notification techniques are possible. For example, the AHS 151 or the monitoring service 161 can be configured to attempt to recover the application via restart by sending a message to the service 405 as described above.

Figure 5:
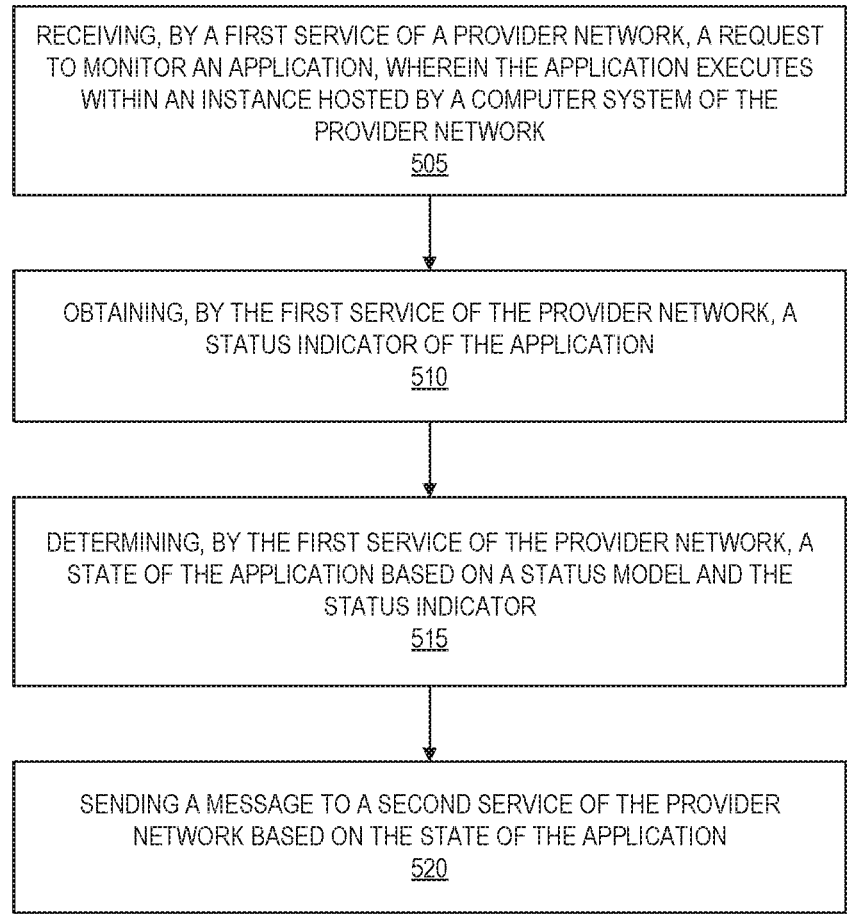
FIG. 5 is a flow diagram illustrating operations of a method for monitoring customer applications hosted within a provider network according to some embodiments.

FIG. 5 is a flow diagram illustrating operations of a method for monitoring customer applications hosted within a provider network according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the AHS 151 of the other figures.

The operations include, at block 505, receiving, by a first service of a provider network, a request to monitor an application, wherein the application executes within an instance hosted by a computer system of the provider network. For example, a customer can configure the provider network 100 to monitor a customer application by submitting a request from application 307 to the AHS 151 via interface(s) 311. The request can include an identification of the application, such as an IP address and port number or other identifier(s) to distinguish the application to be monitored from other monitored applications of the customer or other customers. In some embodiments, the customer may select a predefined status model or submit or identify a custom status model that relates application status information to application states as part of the request. In some embodiments, the customer may further specify a schedule or frequency at which the application status should be checked or should be expected to report status information.

The operations include, at block 510, obtaining, by the first service of the provider network, a status indicator of the application. As described herein, various implementations of the AHS 151 can query monitored applications or application agents for application status information, can vend an API via which applications or agents can submit application status information, or some combination of active (e.g., via a request and response) and passive (e.g., via an API to submit status information) gathering of application status information.

The operations include, at block 515, determining, by the first service of the provider network, a state of the application based on a status model and the status indicator. As described herein, application status information can include one or more status indicators such as status codes, application resource utilization metrics (e.g., processor usage), errors, etc. Based on the application status information and the status model, the AHS 151 can determine the application state. For example, if the AHS 151 issues an HTTP request to the application being monitored, the AHS can use the HTTP status code included in the response as a status indicator. A normal or 'OK' response can indicate the application state is nominal while a timeout or other response can indicate the application state is in error.

The operations include, at block 520, sending a message to a second service of the provider network based on the state of the application. Based on the application state, the AHS 151 can communicate with another service of the provider network. For example, the AHS 151 may send a message to a monitoring service each time the application state is determined, or upon the transition of the application state from one state to another state. As another example, the AHS 151 can send a message to the instance management service 145 to cause a restart of an instance should the instance enter a nonresponsive state.

As described herein, an application health service monitors the status of customer applications hosted within a provider network. In an exemplary embodiment, the customer configures the AHS to obtain status information of an application and provides a status model against which the AHS can evaluate the application status. By evaluating the application status information against the status model, the AHS can determine the application state. Based on the application state, the AHS or other service of the provider network can cause one or more actions to occur within the provider network, such as actions to remediate an application state indicative of an error. For example, the AHS can cause the instance hosting the application to restart or to move to another physical computer system.

By embedding application monitoring within a provider network, customers avoid the burden of setting up an "over-the-top" application monitoring solution that requires the development and/or deployment of additional monitoring software on additional computing-related resources of the provider network at additional cost. Further, by embedding application monitoring within the provider network, the provider network may be able to detect faults within the provider network 100 that are not localized to a single application by aggregating application status information from multiple applications hosted by the provider network.

Figure 6:
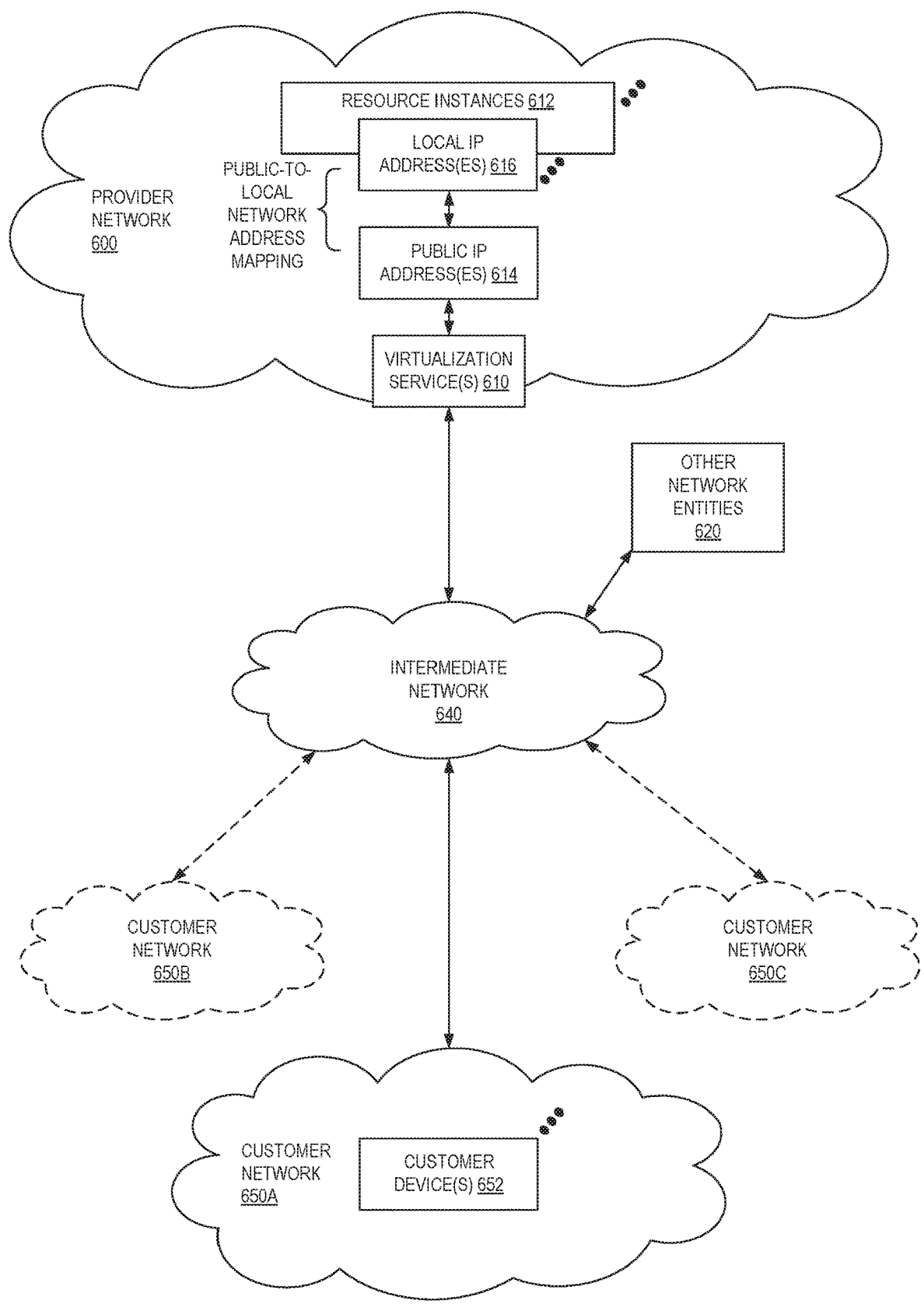
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
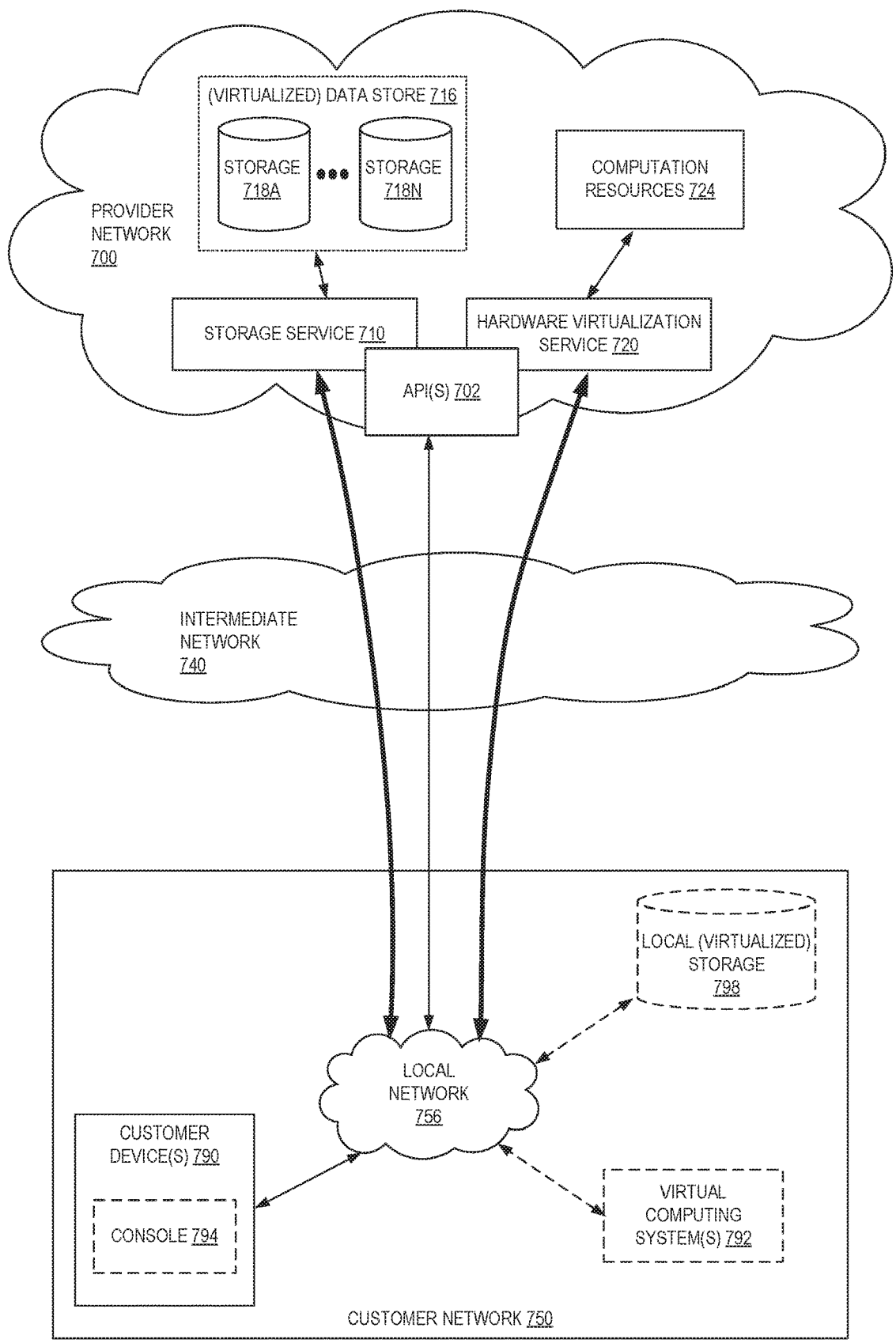
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
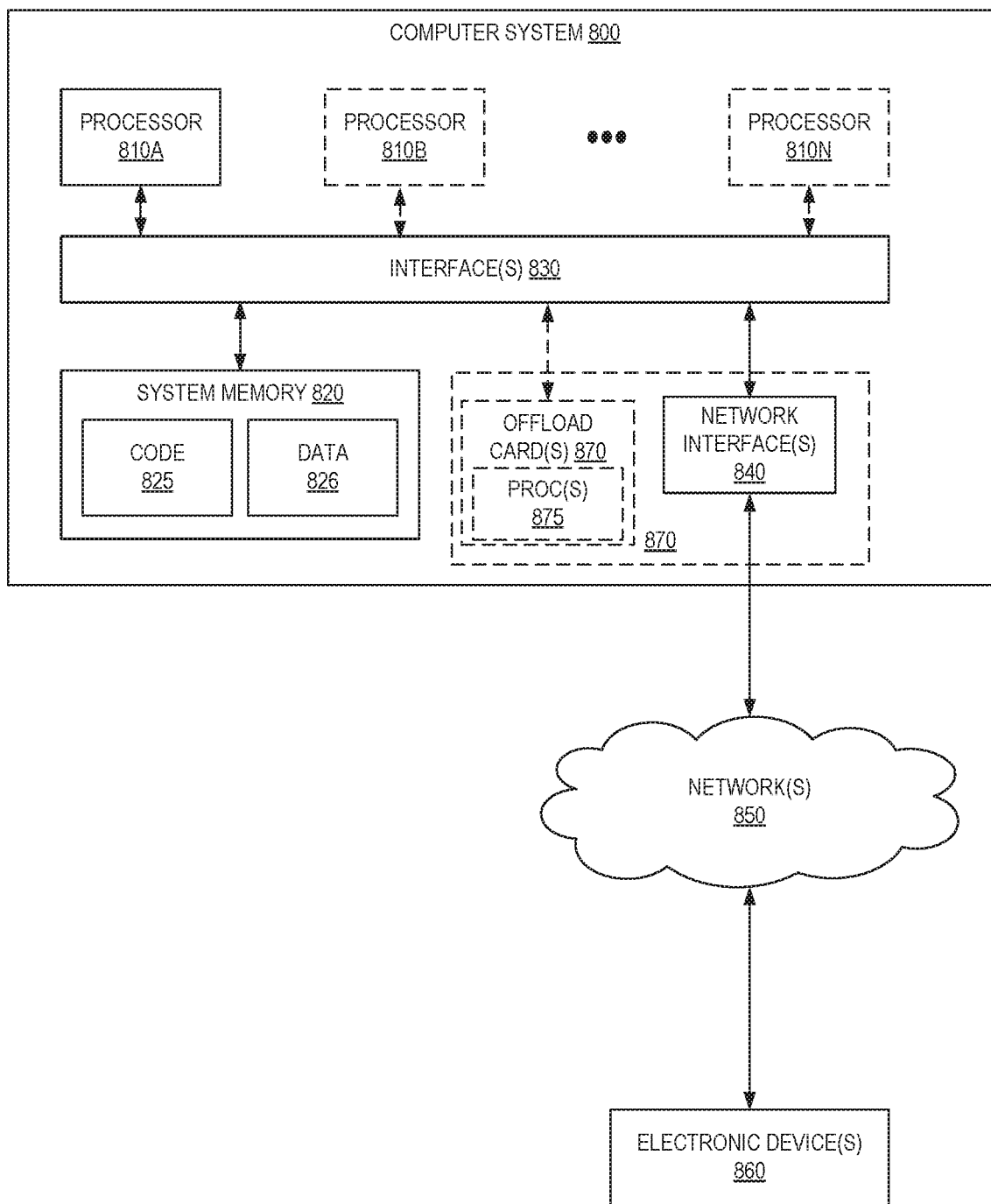
FIG. 8 is a block diagram illustrating an example computer system that may be used in some embodiments.

FIG. 8 is a block diagram illustrating an example computer system that may be used in some embodiments. In some embodiments, the computer system 800 implements a portion or all of the techniques for monitoring customer applications hosted within a provider network. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C #or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, by an application health service executing on a first computer system of a provider network, a request from a second computer system to monitor an application, the request associated with an account of the provider network and including an application identifier and a status model identifier, wherein the application executes in an instance hosted by a third computer system of the provider network;
   sending, by the application health service, a request to an Internet Protocol (IP) address and port number of an application associated with the application identifier included in the request, wherein the application responds to requests to the IP address and port number from the application health service and from another application executed by at least one of an electronic device outside of the provider network and another computer system of the provider network; and
   receiving a response from the application, wherein the response includes a status indicator;
   determining, by the application health service a state of the application based on the status indicator and a status model associated with the status model identifier included in the request, wherein the status model relates the status indicator to one of a plurality of application states; and
   causing an action based on the state of the application.

2. The computer-implemented method of claim 1, wherein the action is selected from the group consisting of restarting the application, restarting the instance on the first computer system of the provider network, or migrating the instance to another computer system of the provider network.

3. The computer-implemented method of claim 1, wherein obtaining the status indicator of the application comprises:
   sending a HyperText Transfer Protocol (HTTP)-based request to the application; and
   receiving an HTTP-based response from the application, wherein an HTTP status code of the HTTP-based response is the status indicator.

4. A method comprising:
   receiving, by an application health service executing on a first computer system of a provider network, a request from a second computer system to monitor an application of a customer of the provider network that executes in an instance hosted by a third computer system of the provider network, wherein the request includes a status model identifier;
   sending, by the application health service, a request to an Internet Protocol (IP) address and port number of the application, wherein the application responds to requests to the IP address and port number from the application health service and from another application executed by at least one of an electronic device outside of the provider network or another computer system of the provider network;
   receiving a response from the application, wherein the response includes a status indicator;
   determining, by the application health service of the provider network, a state of the application based on the status indicator and a status model associated with the status model identifier included in the request, wherein the status model relates the status indicator to one of a plurality of application states; and
   sending, by the application health service of the provider network, a message to a second service of the provider network based on the state of the application.

5. The method of claim 4, wherein obtaining the status indicator of the application comprises:
   sending a HyperText Transfer Protocol (HTTP)-based request to the application; and
   receiving an HTTP-based response from the application, wherein an HTTP status code of the HTTP-based response is the status indicator.

6. The method of claim 4, further comprising causing an action based on the state of the application.

7. The method of claim 6, wherein the action is selected from the group consisting of restarting the application, restarting the instance on the first computer system of the provider network, or migrating the instance to another computer system of the provider network.

8. The method of claim 4, further comprising storing the status model in a storage device of the provider network, wherein the request identifies the status model.

9. The method of claim 4, wherein obtaining the status indicator of the application includes receiving no response from the application.

10. The method of claim 4, further comprising:
    sending an Address Resolution Protocol (ARP) request to the instance to check a status of the instance; and
    sending an ARP request to the computer system to check a status of the third computer system.

11. The method of claim 4, wherein the second computer system comprises an electronic device outside of the provider network.

12. The method of claim 4, wherein a first computer system of the provider network hosts the instance, and wherein the second service causes at least one of a restart of the application, a restart of the instance on the first computer system, or a migration of the instance to a second computer system of the provider network.

13. A system comprising:
    a customer application hosted by an instance on a first computer system of a provider network; and
    an application health service implemented by a second computer system of the provider network, the application health service including instructions that upon execution by one or more processors cause the application health service to:
       receive a request to monitor the customer application from a third computer system, the request associated with an account of the provider network and including an application identifier associated with the customer application, wherein the request includes a status model identifier;
       send a request to an Internet Protocol (IP) address and port number of the customer application, wherein the customer application responds to requests to the IP address and port number from the application health service and from another application executed by at least one of an electronic device outside of the provider network or another computer system of the provider network;

receive a response from the customer application, wherein the response includes a status indicator;

determine a state of the customer application based on the status indicator and a status model associated with the status model identifier included in the request, wherein the status model relates the status indicator to one of a plurality of application states; and send a message to a second service of the provider network based on the state of the customer application.

14. The system of claim 13, wherein the application health service further includes instructions that cause the application health service to:

send a HyperText Transfer Protocol (HTTP)-based request to the customer application; and receive an HTTP-based response from the application, wherein an HTTP status code of the HTTP-based response is the status indicator.

15. The system of claim 13, wherein the application health service further includes instructions that cause the application health service to cause an action based on the state of the application.

16. The system of claim 15, wherein the action is selected from the group consisting of restarting the application, restarting the instance on the first computer system of the provider network, or migrating the instance to another computer system of the provider network.

17. The system of claim 13, wherein the application health service further includes instructions that cause the application health service to store the status model in a storage device of the provider network, wherein the request identifies the status model.

18. The system of claim 13, wherein the application health service further includes instructions that cause the application health service to obtain the status indicator of the customer application based on no response from the customer application.

19. The system of claim 13, wherein the application health service further includes instructions that cause the application health service to:

send an Address Resolution Protocol (ARP) request to the instance to check a status of the instance; and send an ARP request to the first computer system to check a status of the first computer system.

20. The system of claim 13, wherein the second computer system comprises an electronic device outside of the provider network.

* * * * *